United States Patent [19]

Maahs

[11] Patent Number: 4,656,699
[45] Date of Patent: Apr. 14, 1987

[54] BAIT SNAP

[76] Inventor: William F. Maahs, P.O. Box 971, Fort Bragg, Calif. 95437

[21] Appl. No.: 212,688

[22] Filed: Dec. 3, 1980

[51] Int. Cl.⁴ ............................................. A44B 13/02
[52] U.S. Cl. ........................................ 24/237; 24/231
[58] Field of Search .......................... 24/237, 231, 236

[56] References Cited

U.S. PATENT DOCUMENTS

| | | | |
|---|---|---|---|
| 745,131 | 11/1903 | Abbath | 24/237 |
| 1,728,560 | 9/1929 | Goshorn | 24/237 |
| 2,371,295 | 3/1945 | Hopkins | 24/237 |
| 2,720,014 | 10/1955 | Calowell | 24/237 |
| 3,335,472 | 8/1967 | Imai | 24/237 |
| 4,004,328 | 1/1977 | Bohn et al. | 24/237 |
| 4,234,998 | 11/1980 | McMickle | 24/237 |

Primary Examiner—Gene Mancene
Assistant Examiner—David I. Tarnoff
Attorney, Agent, or Firm—Leonard Bloom

[57] ABSTRACT

A bait snap for affixing a baited hook to a fishing line or the like so that different lures, hooks, and baits may be expeditiously transferred in the shortest amount of time. The device includes first and second legs which meet at an angle, the conjunction of which provides a nesting spot for a line from which the hook depends, the first leg extending substantially linearly, the second leg having a bend in it and extending into a third leg which passes through a middle portion of the bait snap and terminates in an upper portion. The first leg continues substantially linearly through the middle portion and upper portion and terminates in a curved section, the curved section extending into a fourth leg which generally is directed towards the second leg, the fourth leg or section terminating in a C-shaped clamp which serves to engage both the first leg and provide an access area for the third leg to nest therewithin for clasping engagement. The upper portion of the bait snap communicates with the fishing rod through a line and the contour thereof is such that free movement through the arcuate section of attachment is possible to minimize resistance, and assure that the line is not fouled in any manner. The angled lower portion from which the hook depends is so constructed that the hook and its attachment to the bait snap will not ride up or away from the intersection of the first and second legs.

4 Claims, 4 Drawing Figures

BAIT SNAP

BACKGROUND OF THE INVENTION

Since time immemorial fishing has provided a food source for man and man's preoccupation with fishing has gradually evolved into one in which pleasure is derived for the casual sportsman, and also a living can be derived for a professional sportsman.

Irrespective, the angler today is now more aware of fishes' habits than ever and it is abundantly clear that a large variety of hooks, baits, lures, etc are desirable to maximize and optimize the fishing process. This optimization is especially critical to the professional sport fisherman who fishes in competition against others when time is of the utmost importance.

In this regard, the amount of time required in changing lures, hooks, bait, and the like is of critical importance since the opportunity to catch a fish in a school when the angler is stationary is a limited opportunity. Therefore, it sometimes becomes desirable to change these lures and the like in accordance with that which is most likely to catch more fish.

Whereas bait snaps have been known to exist in the prior art, many of these devices suffer from a variety of defects, one of the most notable of which is the amount of time required to replace the hook. When fishing in inclement weather, many of these devices are not readily adapted to be engaged and disengaged when a person is wearing gloves, and therefore an unnecessary inconvenience exists in removing the gloves in order to change the bait much to the detriment of the fisherman.

Furthermore, it is desired to have a bait snap of such a configuration that the amount of play between the fishing rod and the fishing lure is extremely sensitive so that a bashful type of fish can be sensed when it is nibbling on the bait.

It is still of utmost importance to have a interconnection between the hook and the fishing pole in which there is an optimal linkage so that should setting the hook be necessary there is no lost motion, play, slop, or the like.

Many of the prior art devices share the above deficiencies in one aspect or many aspects.

OBJECTS AND SUMMARY OF THE INVENTION

Accordingly, this invention has as an object the provision a bait snap in which various hooks, lures and baits may be changed in a minimum amount of time.

It is yet a further object of this invention to provide a device of the character described above in which this changing operation can be done efficiently, without the need to remove one's gloves in inclement weather and the like.

It is yet another object of this invention to provide a device of the character described above in which the linkage between the fishing pole and the hook is such that the orientation of the hook and bait relative to the fishing pole is held constant and predictable.

It is yet a further object of this invention to provide a device of the character described above in which there is no lost motion involved when it is desired to set a hook, that is that the bait snap does not provide a sloppy transfer of the setting motion.

It is still a further object of this invention to provide a device of the character described above in which the bait snap is not provided with any harmful extremities which can inadvertantly snag or impale the user.

It is still yet a further object of this invention to provide a device of the character described above in which the article is relatively inexpensive to manufacture, extremely durable in construction, and impervious to the elements.

These and other objects will be made manifest when considering the following detailed specification when taken in conjunction with the appended drawing figures.

BRIEF DESCRIPTION OF THE DRAWING FIGURES

DESCRIPTION OF THE PREFERRED EMBODIMENT

Figure 1:
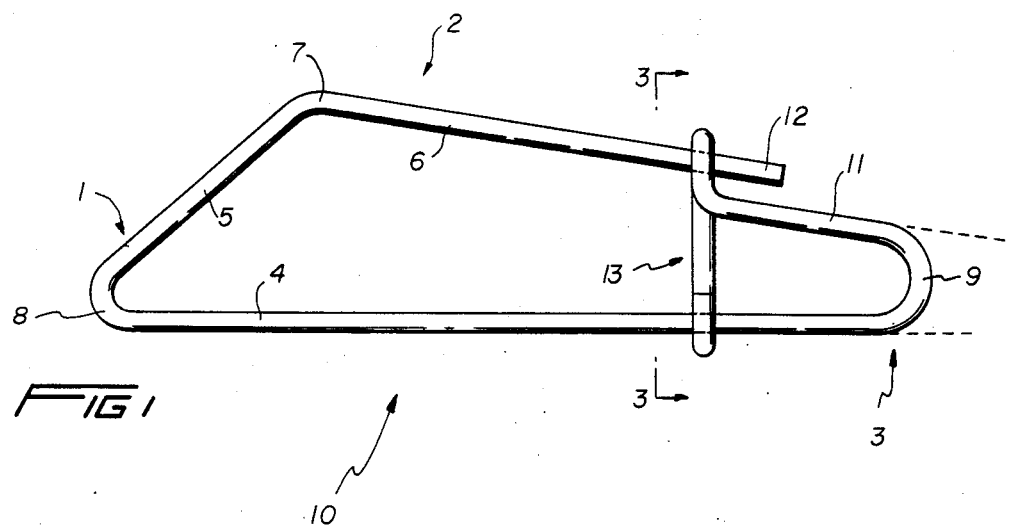
FIG. 1 is a side view of the bait snap according to the present invention.

Referring to the drawings now, wherein like reference numerals refer to like parts throughout the various drawing figures, reference 10 is directed to the bait snap according to the present invention.

The bait snap 10 may generally be regarded as having a lower portion 1, a middle portion 2 and an upper portion 3, the upper and lower portions respectively being affixed to the line extending to the fishing pole, and to the hook, lure and bait.

Figure 2:
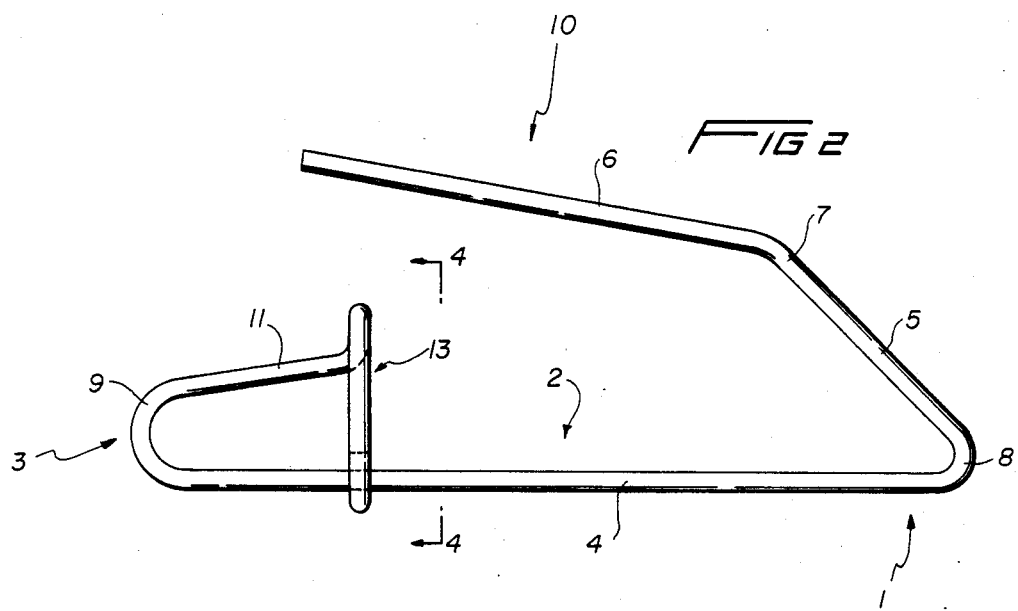
FIG. 2 is a side view of the opposite side of the bait snap shown in FIG. 1 with the bait snap unclasped so as to allow admission of a fishing line, hook, etc.
Figure 3:
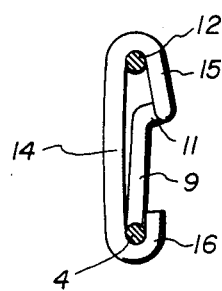
FIG. 3 is a sectional view taken along lines 3—3 of FIG. 1.
Figure 4:
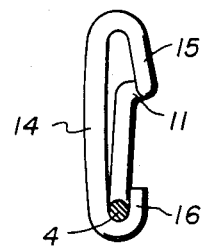
FIG. 4 is a sectional view taken along lines 4—4 of FIG. 2.

The lower portion 1 is provided with a first leg 4 a second leg 5 terminating and intersecting at an angle 8 sufficiently acute so that when the line leading to the hook is looped thereover, the line will not readily ride up either leg. The first leg 4 is substantially linear and extends through the middle and terminates at the upper portion in a curved section 9. The second leg extends into the middle portion and meets with a third leg 6 at bend 7. The third leg 6 terminates in the upper portion at 12. A fourth leg is provided, the fourth leg 11 continuing away from the curved section 9 as best seen in FIGS. 1 and 2, and the first leg and fourth legs as they extend from the curved section 9 extend away therefrom in such a manner that a smooth contour is provided and a tangent line drawn from a last curved area of the curved section 9 is substantially tangent and congruent with the first and fourth legs. It is to be noted in the drawings that the fourth leg extends from the curved section in such a manner that it points toward the second leg. A terminal portion of the fourth leg transfers into a clasping means 13 which as best shown in FIGS. 3 and 4 are of substantially C-shaped configuration. These two views make it abundantly clear that the fourth leg is skewed from the plane formed by the first, second and third legs. The clasping means includes a clasp of C-shaped configuration having a downwardly extending portion 15 communicating with the fourth leg 11, a back portion 14 the conjunction between 15 and 14 being such that it overlies the third leg 12 as shown in FIG. 3, the bottom portion of the back 14 extending in an upwardly curved terminal segment 16 in such a manner that the first leg 4 is nested therewithin.

In this manner, it should be apparent that the terminal portion of the third leg 12 is swung in an arc so that that it underlies the fourth leg 11 and is allowed to open freely as shown in FIG. 2 when the bail, hooks, lures, etc. are to be changed. However when the change has been effected, the third leg 6 is looped in such a manner that it is constrained by the C-shaped clasp.

In a preferred form, it should be apparent that the entire bait snap is formed from a single piece made of spring material, although various substitutions of materials such changing from metal to plastic with a memory should be considered as being within the fair scope of this invention.

Furthermore, it should be apparent that numerous other structural modifications are contemplated as being a part of this invention as substantially set forth hereinabove and defined hereinbelow by the claims.

What is claimed is:

1. A bait snap for affixing a baited hook to a fishing line or the like comprising, in combination:

a lower portion defined by the conjunction of first and second legs which said legs extend to a middle portion of said bait snap, said first leg extending substantially linearly through said middle portion and onto an upper portion, said second leg provided with a bend in said middle portion and thereafter defining a third leg linear along its entire length which terminates in an upper portion of said bait snap without a bend in said third leg, said first leg continuing to a curved section which curves toward said second leg, a linear fourth leg extending from said curved section, and clasping means connected to said fourth leg remote from said curved section whereby a terminal linear unbent portion of said third leg is clasped therein, so that the baited hook can be easily placed on and retained at said lower portion and said third leg can be passed through both the baited hook and bait, wherein said clasping means comprises a C-shaped element disposed in a plane transverse to the plane of said first, second and third legs, one end of said element affixed to said fourth leg, another end of said element underlying said first leg whereby said third leg bypasses under said fourth leg for clasping and unclasping engagement.

2. The bait snap of claim 1 wherein said fourth leg is skewed from the plane of said first, second and third legs.

3. The device of claim 2 wherein said bait snap is formed from one piece of spring material.

4. The device of claim 3 wherein said linear first and fourth legs connected to said curved section in a smooth manner such that said first and fourth legs are parallel with and substantially congruent with tangent lines extending from said curved section.

* * * * *